United States Patent [19]

Murano et al.

[11] Patent Number: 4,856,380

[45] Date of Patent: Aug. 15, 1989

[54] METHOD OF CONTROLLING CLUTCH PRESSURE OF CONTINUOUSLY VARIABLE TRANSMISSION SYSTEM

[75] Inventors: Katsuaki Murano; Sadayuki Hirano, both of Hamamatsu; Yoshinori Yamashita, Hamana; Takumi Tatsumi; Hiroaki Yamamoto, both of Himeji, all of Japan

[73] Assignees: Suzuki Jidosha Kogyo Kabushiki Kaisha, Shizuoka; Mitsubishi Denki Kabushiki Kaisha, Tokyo, both of Japan

[21] Appl. No.: 229,893

[22] Filed: Aug. 8, 1988

[30] Foreign Application Priority Data

Aug. 10, 1987 [JP] Japan .................. 62-199416

[51] Int. Cl.$^4$ .......................................... B60K 41/16
[52] U.S. Cl. .................... 74/866; 192/3.58; 364/424.1
[58] Field of Search ............ 74/866, 867, 858; 192/30 W, 3.58; 364/424.1

[56] References Cited

U.S. PATENT DOCUMENTS

| 4,393,732 | 7/1983 | Suzuki et al. ............ 74/867 X |
| 4,660,440 | 4/1987 | Matsumura et al. ........ 74/868 X |
| 4,662,488 | 5/1987 | Hiramatsu et al. ......... 192/3.58 |
| 4,664,235 | 5/1987 | Yokoyama et al. ...... 192/3.58 X |
| 4,724,724 | 2/1988 | Tezuka ................. 364/424.1 X |
| 4,725,951 | 2/1988 | Niikura ................... 364/424.1 |
| 4,744,269 | 5/1988 | Greene et al. .............. 74/868 |
| 4,764,156 | 8/1988 | Ohkumo .................. 74/856 X |

FOREIGN PATENT DOCUMENTS

| 228263 | 7/1987 | European Pat. Off. ....... 74/856 |
| 56-49450 | 5/1981 | Japan ........................... 74/866 |
| 57-186656 | 11/1982 | Japan . |
| 59-43249 | 3/1984 | Japan . |
| 59-77159 | 5/1984 | Japan . |
| 61-233256 | 10/1986 | Japan . |

Primary Examiner—Leslie A. Braun
Assistant Examiner—Christopher C. Campbell
Attorney, Agent, or Firm—Flynn, Thiel, Boutell & Tanis

[57] ABSTRACT

A method of controlling clutch pressure in a continuously variable transmission system which can expand and contract the width of a channel between a stationary pulley member and a movable pulley member movable relative to the stationary pulley member in order to respectively contract and expand a radius of travel about the pulleys of a belt engaging the pulleys before eventually varying a belt ratio, a clutch-pressure control arrangement of the continuously variable transmission system including a controller unit which effects control by feeding an actually-detected clutch pressure back in determining an objective clutch pressure and including an oil-pressure circuit which controls oil pressure in response to signals from the controller unit; the method comprising the step of: causing the controller unit to calculate a clutch duty ratio in reference to the objective clutch pressure and an objective line pressure when a pressure sensor detecting the actually-detected clutch pressure outputs an abnormal signal before eventually causing the controller unit to control the clutch pressure in accordance with the calculated clutch duty ratio.

2 Claims, 7 Drawing Sheets

| Control mode | Control mode identifying condition ||||| Clutch control output ||
| --- | --- | --- | --- | --- | --- | --- |
| | Shift-lever position | Accelerator pedal signal | Engine revolution | Clutch output shaft revolution | PWM signal | Clutch condition |
| Neutral | N or P | × | × | × | Open-loop output 100% duty | OFF |
| Hold | R or D or L | OFF | × | ∨ | Closed-loop output Outputs duty aiming at -35 kg/cm² of clutch | Half clutch (creep) |
| | R or D or L | ON | ∨ | | | |
| Start | R or D or L | ON | ≧ | ∨ | Closed-loop output Outputs duty using objective value based on throttle engine revolution | Transmits engine torque to wheels |
| Special start | R or D or L | ON or OFF | ∧ | ≧ | Closed-loop output Outputs duty using objective value based on the clutch slipping amount | Synchronizes clutch input/output revolution |
| Drive | R or D or L | × | ≧ | ∧ | Outputs open loop 0% duty | ON (locked) |

FIG. 9

× : No need for identifying conditions.
ON : The state in which the vehicle is about to start off with accelerator pedal being depressed.
OFF : The state in which accelerator pedal is not depressed.
∨ : The value is less than the established value.(1200rpm).
∧ : The value is more than the established value.(1200rpm).
≧ : The value is more than or equal to the established value.(1200rpm).

METHOD OF CONTROLLING CLUTCH PRESSURE OF CONTINUOUSLY VARIABLE TRANSMISSION SYSTEM

CROSS REFERENCE TO RELATED APPLICATIONS

This application is related to our copending applications filed concurrently herewith and entitled (1) METHOD OF CONTROLLING CONTINUOUSLY VARIABLE TRANSMISSION SYSTEM filed Aug. 8, 1988 as U.S. Ser. No. 229,899 (corresponding to Japanese Serial No. 62-199411, filed Aug. 10, 1987, attorney reference: Saigoh Case 70), (2) METHOD OF CONTROLLING CLUTCH OF CONTINUOUSLY VARIABLE TRANSMISSION SYSTEM filed Aug. 8, 1988 as U.S. Ser. No. 229,909 (corresponding to Japanese Serial No. 62-199412, filed Aug. 10, 1987, attorney reference: Saigoh Case 71), (3) METHOD AND APPARATUS OF CONTROLLING LINE PRESSURE OF CONTINUOUSLY VARIABLE TRANSMISSION SYSTEM filed Aug. 8, 1988 as U.S. Ser. No. 229,900 (corresponding to Japanese Serial No. 62-199415, filed Aug. 10, 1987, attorney reference: Saigoh Case 72) (4) HYDRAULIC CONTROL METHOD FOR CONTINUOUSLY VARIABLE SPEED CHANGE GEAR MECHANISM FOR A VEHICLE AND A DRIVE CONTROL METHOD FOR A PRESSURE VALVE THEREOF filed Aug. 8, 1988 as U.S. Ser. No. 229,942 (corresponding to Japanese Serial Nos. 62-199420 and 62-310815, filed Aug. 10, 1987 and Dec. 10, 1987, respectively, attorney reference: Saigoh Case 74). The disclosures of these copending applications are incorporated herein by reference.

FIELD OF THE INVENTION

The present invention relates to a method of controlling clutch pressure for use with a continuously variable transmission system and, more particularly, to a method for controlling clutch pressure for use with a continuously variable transmission system in which the control unit first calculates a clutch duty ratio in reference to objective clutch pressure and objective line pressure in the event a pressure sensor outputs abnormal signals, and then finally executes control of clutch pressure by applying the calculated clutch duty ratio.

BACKGROUND OF THE INVENTION

Any conventional vehicle is provided with a transmission system between the internal combustion engine and the driving wheels. Any conventional transmission system varies the driving force and speed of the wheels in accordance with widely variable driving conditions of the vehicle itself, to allow the engine to fully exert optimum performance. There are a variety of continuously variable transmissions systems, for example those which are disclosed in official Japanese Patent Laid-Open Publication Nos. 57-186656 (1982), 59-43259 (1984), 59-77159 (1984) and 61-233256 (1986). Any of these conventional, continuously variable transmission systems transmits the driving force through expanding or contracting the radius of rotation of a belt by selectively expanding or contracting the width of a channel formed between a stationary pulley member secured to a revolving shaft and a movable pulley member supported on the revolving shaft so that the movable pulley member can come into contact with and leave the stationary pulley shaft before eventually varying the belt ratio.

Any conventional clutch-pressure control system of a conventional continuously variable transmission executes feedback control over the objective (or in other words desired) clutch pressure using the actual clutch pressure when any of a hold, a start, and a special start mode of clutch control is activated. A controller unit calculates a clutch duty ratio which is used to drive a clutch-pressure control valve in order to minimize clutch pressure when the value of clutch pressure is maximum and vice versa in the event a pressure sensor goes out of order or a signal cable is either disconnected or short-circuited. As a result, the clutch is compulsorily held in an ON or an OFF condition, thus inhibiting the vehicle from starting to move or causing a sharp shock to be generated from the clutch engagement.

A primary object of the invention is to fully overcome the problems mentioned above by providing a novel method of controlling clutch pressure for use with a continuously variable transmission system which includes the following: a controller unit which executes control operation by feeding the actually detected clutch pressure back to the objective clutch pressure; and an oil-pressure circuit which controls clutch pressure in response to signals from the controller unit. The clutch-pressure control system according to the invention is to cause the controller unit to calculate a clutch duty ratio in reference to the objective clutch pressure and objective line pressure, and is to allow the controller unit to properly control clutch pressure in accordance with the calculated clutch duty ratio. Consequently, the clutch-pressure control system according to the invention is to properly control clutch pressure even when the pressure sensor malfunctions, when a signal cable is either disconnected or short-circuited, or when atmospheric temperature drops extremely, by generating a satisfactory control effect almost equivalent to that during a normal condition of use, thus securely preventing an unwanted failure which results in an inability to start movement of the vehicle or results in the occurrence of a sharp shock from the clutch. This offers a practical advantage for all drivers of vehicles.

SUMMARY OF THE INVENTION

To achieve the above object, the invention provides a novel clutch-pressure control system for use with a continuously variable transmission system which either expands or contracts the width of a channel between a stationary pulley member and a movable pulley member in order to expand or contract the radius of rotation of the pulleys before eventually varying the belt ratio, the clutch-pressure control system including the following: a controller unit which executes a control operation by feeding the actually-detected clutch pressure back to the objective clutch pressure; and an oil-pressure circuit which controls the oil pressure in response to signals from the controller unit. The clutch-pressure control system causes the controller unit to calculate a clutch duty ratio in reference to the objective clutch pressure and the objective line pressure when a pressure sensor for detecting clutch pressure outputs abnormal signals, before eventually allowing the controller unit to properly control clutch pressure in accordance with the calculated clutch duty ratio.

The clutch-pressure control system for use with a continuously variable transmission system of the type to which the invention relates causes the controller unit to calculate a clutch duty ratio in reference to the objective clutch pressure and the objective line pressure when the pressure sensor malfunctions, when a signal cable is disconnected or short-circuited, or when the atmospheric temperature drops extremely, by generating a satisfactory clutch-pressure control effect almost equivalent to that which is generated during the normal condition of use. This securely prevents an unwanted failure which results in the inability to start movement of the vehicle itself or the occurrence of a sharp shock from the clutch engagement, thus offering a practical advantage.

BRIEF DESCRIPTION OF THE DRAWINGS

Referring now more particularly to the accompanying drawings, preferred embodiments of the clutch pressure control system for use with a continuously variable transmission system are described below. In the drawings:

FIG. 9 is a table showing the basic clutch pressure control criteria in a normal operating mode;

DETAILED DESCRIPTION

Figure 1:
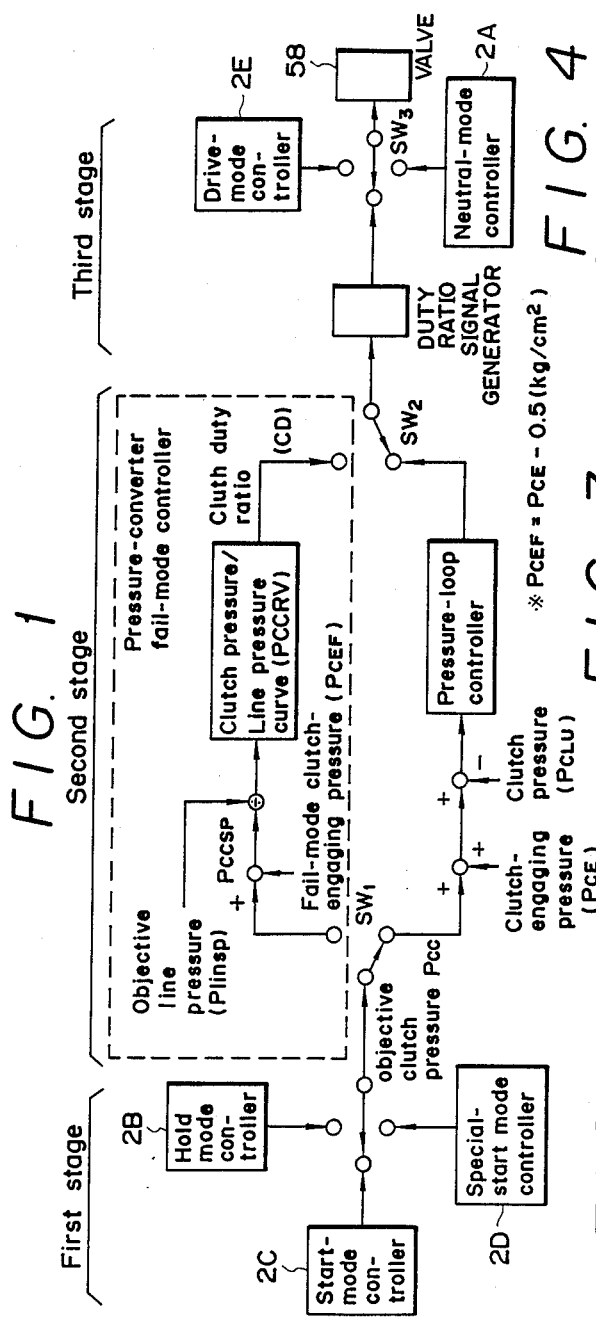
FIG. 1 is a schematic block diagram of a clutch-pressure control system adapted for use in a control unit for a continuously variable transmission system.
Figure 4:
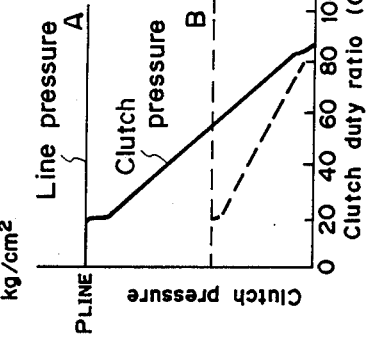
FIG. 4 is a graph presenting a relationship between clutch duty ratio and clutch pressure.

In the drawings, reference numeral 2 designates a belt-driven continuously variable transmission system, 2A a belt, 4 a driving pulley, 10 a driven pulley, 30 a first oil path, 32 a second oil path, 34 a primary-pressure control valve, 36 a third oil path, 38 a constant-pressure control valve, 40 a fourth oil path, 42 a first 3-way electromagnetic valve, 44 a line-pressure control valve, 46 a fifth oil path, 48 a sixth oil path, 50 a second 3-way electromagnetic valve, 52 a clutch-pressure control valve, 54 a seventh oil path, 56 an eighth oil path, 58 a third three-way electromagnetic valve, 60 a ninth oil path, 62 an oil-pressure-driven clutch, 64 a tenth oil path, 66 an eleventh oil path, 68 a pressure sensor, 70 a controller unit, 82 an oil pan, 84 an oil filter, 86 an amplifier, and 88 an A/D converter.

Figure 6:
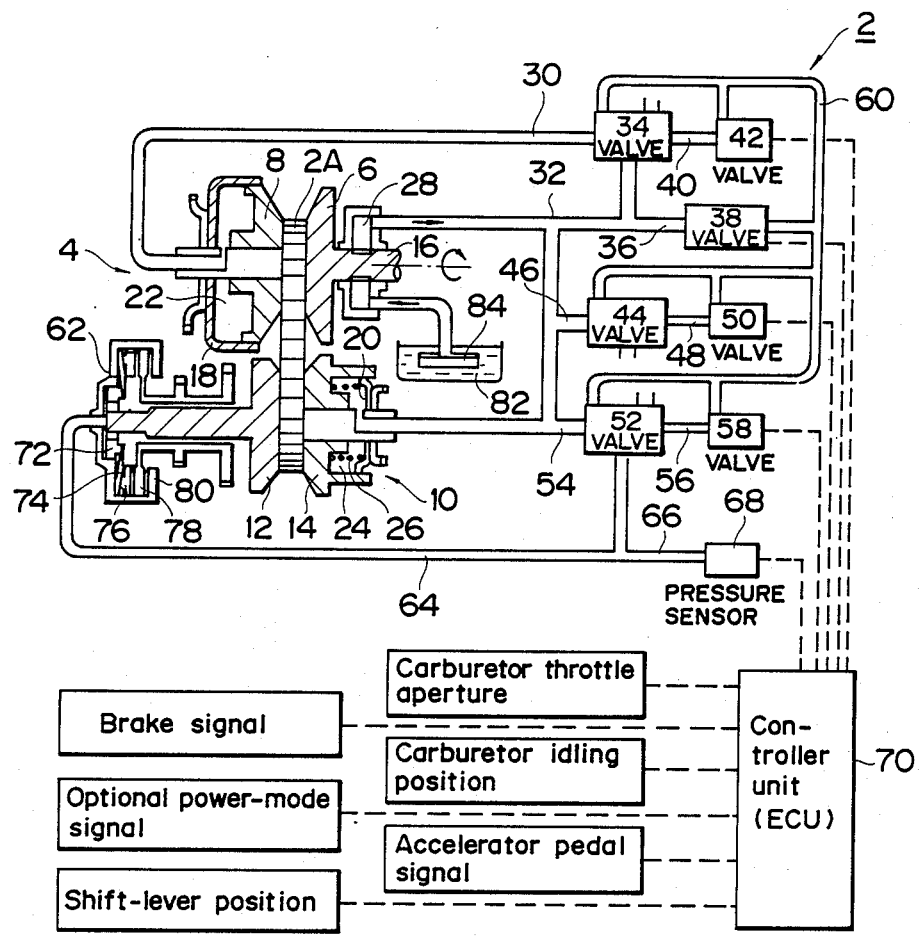
FIG. 6 is a schematic block diagram of a control system embodying the invention and a belt-driven continuously variable transmission system.

First, refer to FIG. 6. A continuously variable belt-driven transmission system 2 of the type to which the invention relates typically includes the following: a belt 2A, a driving pulley 4, a driving-side stationary pulley member 6, a driving-side movable pulley member 8, a driven pulley 10, a driven stationary pulley member 12, and a driven movable pulley member 14. The driving pulley 4 shown in FIG. 6 includes driver-side stationary pulley member 6 secured to the revolving shaft 16 and the driver-side movable pulley member 8 which is movable in the axial direction of the revolution shaft 16 and is supported on it without being able to rotate itself. Like the driving-side pulley 4, the driven pulley 10 includes the driving-side stationary pulley 12 and the driven-side movable pulley member 14. The first and second housings 18 and 20 are respectively cooperable with the driving-side movable pulley member 8 and the driven-side movable pulley member 14. These housings 18 and 20 respectively define first and second oil-pressure chambers 22 and 24. Energizing means 26 composed of a spring is provided in the second oil-pressure chamber 24 to urge the pulley member 14 leftwardly with respect to the second housing 20.

Oil pump 28 is provided on the revolving shaft 16, and this oil pump 28 is connected to a first oil path or passageway 32. Primary pressure control valve 34, which is substantially the transmission control valve, is used for controlling primary pressure in a second oil path 30, i.e. the input shaft sheave pressure, and communicates with the oil path 32. Constant-pressure control valve 38 for regulating 5 through 25kg/cm$^2$ of the line pressure to 1.5 through 2.0 kg/cm$^2$ of constant pressure is connected to the oil path 32 of the oil pump across the primary pressure control valve 34 via a third oil path 36 which controls the line pressure mentioned above. A first three-way electromagnetic valve 42 is connected to the primary pressure control valve 34 via a fourth oil path 40 so that primary pressure can properly be controlled.

Line pressure control valve 44 having a vent-valve function is connected to a midpoint of the oil path 32 via a fifth oil path 46 so that line (pump) pressure can properly be connected. A second three-way electromagnetic valve 50 is connected to the line-pressure control valve 44 via a sixth oil path 48. Furthermore, clutch-pressure control valve 52 is connected to a midpoint of the oil path 32 for the second oil pressure chamber 24 via a seventh oil path 54. On the other hand, a third three-way electromagnetic valve 58 is connected to the clutch pressure control valve 52 via an eighth oil path 56 so that the clutch pressure can properly be adjusted.

The primary-pressure control valve 34, the first three-way electromagnetic valve 42 which controls the primary pressure, constant-pressure control valve 38, the second three-way electromagnetic valve 50 which controls the line pressure, and the clutch-pressure control valve 52 are respectively connected to each other via a ninth oil path 60. The clutch-pressure control valve 52 is connected to an oil-pressure driven clutch 62 via a tenth oil path 64, where a pressure sensor 68 is connected to a midpoint of the tenth oil path 64 via an eleventh oil path 66. Pressure sensor 68 directly detects the oil pressure controlling clutch pressure during hold and start modes, thus making a contribution when generating an instruction to apply the detected oil pressure to the objective (or in other words desired) clutch pressure. In addition, since the clutch pressure is equivalent to line pressure during the drive mode, direct detection of oil pressure also makes a contribution to the control of line pressure.

Controller unit 70 is also provided in the clutch-pressure control system, and causes the clutch-pressure duty ratio to vary on receipt of data signals related to the throttle aperture in a not-illustrated carburetor of the vehicle. The controller unit 70 also controls the opening and closing operations of the first three-way electromagnetic valve 42 controlling the primary pressure, the second three-way electromagnetic valve 50 controlling the line pressure, and the third three-way electromagnetic valve 58 controlling the clutch pressure. The controller unit 70 is responsive to pressure sensor 68. Next, functions of the signals being delivered to the controller unit 70 are described below.

1. Shift-lever position detection signal

This signal affects control of line pressure, ratios, and operations of the clutch needed for implementing modes including P, R, N, D, and L (park, reverse, neutral, drive and low, respectively), by causing unit 70 to control signals related to these operational modes.

2. Carburetor throttle aperture detection signal

This signal is used to calculate engine torque using data previously stored in a memory, and to determine either the objective duty ratio or the objective rotational speed of the engine.

3. Carburetor idling position detection signal

This signal facilitates compensation for the operation of the carburetor throttle aperture sensor and then improves the control accuracy.

4. Accelerator pedal position detection signal

This signal senses the intention of the driver by detecting the condition of the depressed accelerator pedal and then determines the direction of control when the driver starts vehicle movement or during vehicle movement.

5. Brake signal

This signal detects whether the driver has depressed the brake pedal. If depressed, then the brake signal determines the direction of implementing control such as disengagement of clutch.

6. Optional power mode selection signal

This signal from an operator-controlled switch allows the driver to optionally select either sporty performance or economical performance of the vehicle.

Reference numeral 72 denotes a piston of the oil-pressure-driven clutch 62, 74 denotes a ring-shaped spring, 76 denotes a first pressurizing plate, 78 denotes a friction plate, 80 denotes a second pressurizing plate, 82 denotes an oil pan, and 84 denotes an oil filter.

Figure 3:
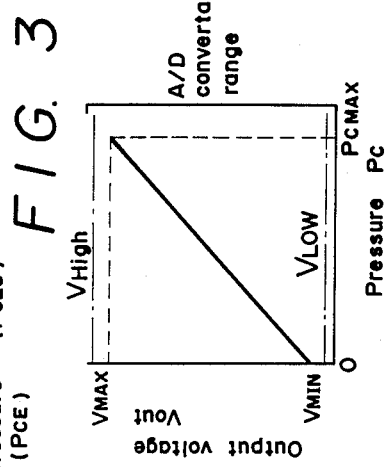
FIG. 3 is a graph presenting a relationship between an output voltage and clutch pressure.
Figure 7:
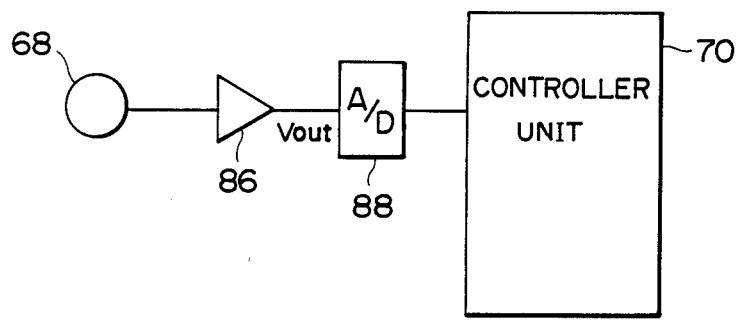
FIG. 7 is a simplified block diagram of part of a controller unit which is a component of the control system of FIG. 6.

The primary-pressure control valve 34 is provided with a not-illustrated spool valve member which reciprocates inside of the valve body. Referring to FIG. 7, a pressure value detected by pressure sensor 68 is first amplified by an amplifier 86, then the amplified signal is converted into a digital value by an A/D (analog to digital) converter 88, and finally this digital value is delivered to the controller unit 70. The analog output-voltage signal (Vout) delivered from amplifier 86 has an optimum range which corresponds to the analog-digital convertible range of A/D converter 88 as shown in FIG. 3, where such range has an upper limit (Vhigh) and a lower limit (Vlow), respectively. The controller unit 70 identifies the occurrence of an abnormal condition in the event any voltage higher than the upper limit (Vhigh) or lower than the lower limit (Vlow) is output from amplifier 86.

Next, conditions for allowing the controller unit 70 to identify the activation of any of the clutch control modes are described below.

1. Neutral mode

The controller unit 70 identifies the presence of neutral mode when the shift lever is in the position N or P, and then reduces clutch pressure totally to 0kg/cm².

2. Hold mode

The controller unit 70 identifies the activation of hold mode when the following conditions are present. The shift lever is at any of the positions R, D or L. The engine revolves at a minimum of 1,000 r.p.m. The clutch output shaft rotates (i.e. the vehicle moves) at a maximum of 8k m/h. The accelerator pedal signal remains OFF because the driver has not depressed the accelerator pedal at all.

When the hold mode is entered, clutch pressure controls the duty-output signal so that the objective clutch pressure can be stabilized at 3.5 kg/cm² of clutch gauge pressure by the feedback operation executed by the controller unit 70.

3. Start mode

The controller unit 70 identifies the activation of start mode when the following conditions are present. The shift lever is at any of the positions R, D or L. The clutch output shaft rotates (i.e. the vehicle moves) at a maximum of 8 km/h. The accelerator pedal signal remains ON and the engine revolves at a minimum of 1,000 r.p.m. With reference to an engine map (i.e. a previously stored characteristic of specific torque values and associated throttle apertures), the engine torque generated by the detected throttle-aperture opening at the time of depressing the accelerator pedal is calculated by the controller unit 70. The calculated engine torque is then multiplied by a proportional gain before eventually converting the engine torque into a transmissible clutch pressure value which is called the feed-forward amount. Furthermore, the controller unit 70 calculates the objective rotational engine speed from the same throttle aperture in accordance with a start-mode schedule discussed below, and then the controller unit 70 executes feedback control over the rotational engine speed before eventually converting the difference from the objective value into the clutch pressure value. The start-mode schedule is used to find the rotational engine speed determined by the throttle aperture, which is related to the engine output characteristic, where rotational engine speeds for respective aperture values are previously stored in a memory as a map. In conjunction with the above arithmetic operation loop, the controller unit 70 calculates an operating value (i.e. a speed-loop deflection) which causes clutch pressure to rise and reduces the actual rotational engine speed when the actual rotational engine speed surpasses the objective rotational engine speed. The controller unit 70 then establishes the start mode objective clutch pressure by applying a duty output signal so that the actual clutch pressure can become the objective clutch pressure by execution of a feedback control operation.

4. Special-start mode

The controller unit 70 identifies the activation of special-start mode when the clutch output shaft rotates (i.e. when the vehicle moves) at a minimum of 8 km/h with the shift lever being at one of the positions R, D or L. The controller unit 70 calculates the clutch-pressure-converted value so that the difference (i.e. the slipping amount of the clutch) between the number of the rotations of the clutch input and output shafts can correspond to a corrected amount Φ. As was also done in the start mode mentioned above, the controller unit 70 controls the actual clutch pressure by applying a duty output signal in order that the actual clutch pressure can become the objective clutch pressure by execution of a feedback control operation to eventually implement the control of the specialstart mode.

5. Drive mode

The controller unit 70 identifies the activation of the drive mode when the following conditions are present. The shift lever is at any of the positions R, D or L. The clutch output shaft rotates (i.e. the vehicle moves) at a minimum of 8 km/h. The clutch slips itself by a maximum of 20 r.p.m. To securely lock the clutch, clutch pressure is maximized.

Referring now to the control-loop block diagram shown in FIG. 1, operations related to the control of clutch pressure are described below.

Clutch pressure is controlled by activating any of those control modes including start (2C), special-start (2D), and hold (2B), where these control modes are composed of three stages of arithmetic operations.

Figure 2:
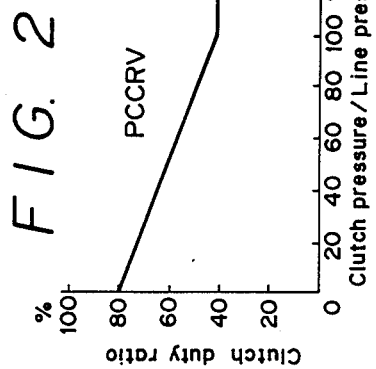
FIG. 2 is a graph presenting a relationship between clutch pressure and line pressure.

The first stage is composed of control means for calculating the objective clutch pressure ($P_{CC}$) when activating the hold, start and special-start control modes. The lower part of the second stage is composed of control means for calculating the correctable amount which is substantially the difference $\Phi$ between the objective clutch pressure ($P_{CC}$) and the actual clutch pressure ($P_{CLU}$) by feeding back the actual clutch pressure during any of the modes including hold, start, and special-start mode. The upper part of the second stage is a fail-mode controller used if pressure sensor 68 fails. The fail-mode controller calculates a clutch duty ratio in reference to the objective clutch pressure ($P_{CCSP}$) and the objective line pressure ($P_{LINSP}$) as shown in FIG. 2 when switches SW1 and SW2 are both actuated in the event pressure sensor 68 outputs an abnormal signal.

The third stage is substantially comprised of generator means which outputs a duty ratio signal that drives the clutch-pressure-controlling third three-way electromagnetic valve 58. When the third stage is entered, the controller unit 70 converts the correctable amount calculated by the second stage into a corresponding specific duty ratio to be output when any of the modes including hold, start, and special-start mode is activated. On the other hand, the controller unit 70 outputs a signal of 100% duty ratio in the neutral control mode 2A and a signal of 0% duty ratio in the drive control mode 2E.

When changing between any of the control modes, for example when transferring from the hold control mode 2B to the start mode 2C, or to the special-start mode 2D, the final value of the objective clutch pressure of the preceding hold control mode 2B is used as the initial value of the objective clutch pressure under the start control mode and the special-start control mode so that the objective clutch pressure can be prevented from entering an intermittent condition while transferring from any one of these control modes to another.

The objective line pressure is set to a preset constant value in the neutral control mode and hold control mode. When shifting from either of the neutral and hold control modes to the start mode or special-start mode, the objective line pressure is set to the value which is calculated in accordance with an opening degree of the throttle valve and changes from the preset constant value to a value such that the engine torque can be transferred without sliding the belt reeved to the pulley.

The change in the objective line pressure value is not constant but varies, e.g., quickly, slowly, linearly, or non-linearly in accordance with the opening degree, opening speed, or the like of the throttle valve when the accelerator pedal is operated. At this time, the the final value of the objective clutch pressure in the hold control mode is set to the initial value in the start mode. The objective clutch pressure changes, for instance, quickly, slowly, linearly, or non-linearly from this initial value to a value such that the engine torque can be transferred without sliding the clutch in accordance with the opening degree, opening speed, or the like of the throttle valve when the accelerator pedal is operated.

When shifting from the start mode to the drive control mode, the objective line pressure is calculated on the basis of the engine speed, throttle valve opening degree, and change gear ratio so that the engine torque can be sufficiently transferred. The objective clutch pressure in the drive control mode is set to the maximum value such that the clutch is locked up and the engine torque can be sufficiently transferred, so that it is set to the same value as the line pressure.

Also, the line pressure control valve 44 (FIG. 6) is controlled directly by the objective line PRESSURE $P_{LINSP}$.

Next, the functional operation of the belt-driven continuously variable transmission system of the invention is described.

The belt-driven continuously variable transmission system shown in FIG. 6 causes the oil pump 28 at the revolving shaft 16 to operate in response to the rotational movement of the revolving shaft 16 so that oil from oil pan 82 at the bottom of the transmission unit is drawn into oil pump 28 through oil filter 84. Line pressure which is normally substantially the pump pressure is controlled by line-pressure control valve 44. However, the line pressure drops if a substantial amount of oil leaks out of the line-pressure control valve 44; that is, if a considerable amount of oil is vented from this valve 44, then the line pressure drops. Conversely, if a negligible amount of oil leaks out of the line-pressure control valve 44, the line pressure rises. The line-pressure control valve 44 varies the line pressure under full-low, full-overdrive and fixed ratio modes, while this valve 44 has a characteristic to control the transmission in these three stages. Operation of the line-pressure control valve 44 is exclusively controlled by the second three-way electromagnetic valve 50, where the line pressure control valve 44 operates itself pursuant to the operation of the second three-way electromagnetic valve 50 as valve 50 is controlled by a specific duty ratio signal of a constant frequency. When 0% of the duty ratio is present, the second three-way electromagnetic valve 50 is totally inactivated to allow its output side to be at atmospheric pressure. This reduces the effective output oil pressure to zero. Conversely, when 100% of the duty ratio is present, the second three-way electromagnetic valve 50 is activated to allow its output side to be at full line pressure, thus generating maximum output of oil pressure identical to the control pressure. This allows variation of the duty ratio between 0% and 100% to vary the output oil pressure. The second three-way electromagnetic valve 50 has a specific characteristic which is almost linear. This in turn allows the line-pressure control valve 44 to perform an analog operation and control the line pressure by varying the duty ratio supplied to the second three-way electromagnetic valve 50. Operation of the second three-way electromagnetic valve 50 is controlled by the controller unit 70.

Primary pressure which controls the transmission is controlled by the primary-pressure control valve 34. Similar to the line-pressure control valve 44 controlled by valve 50, operation of the primary-pressure control valve 34 is exclusively controlled by the first three-way electromagnetic valve 42 which is used for connecting the primary pressure line either to the line pressure or to atmospheric pressure. When the primary pressure is connected to the line pressure, the belt ratio is transferred to full-overdrive side. When the primary pressure is atmospherically connected, the belt ratio is transferred to the full-low side.

If maximum clutch pressure is needed clutch-pressure control valve 52 is connected to the line pressure, whereas if minimum clutch pressure is needed clutch-pressure control valve 52 is connected to atmospheric pressure. Like the line-pressure valve 44 and the primary-pressure control valve 34, operation of the clutch-pressure control valve 52 is exclusively controlled by the third three-way electromagnetic valve 58, and thus a detailed description is omitted. Clutch pressure is variable between the minimum atmospheric pressure (zero) and the maximum line pressure.

There are four basic patterns for controlling the clutch pressure, including the following:

(1) Neutral mode

Clutch pressure is zero when the clutch is fully disengaged at the shift position N or P.

(2) Hold Mode

Clutch pressure is held low in order that the clutch can remain slightly in contact due to the clutch pressure when the driver demonstrates no intention to start movement of the vehicle by leaving the throttle off with the shift position being set to D or R, or when the driver intends to turn off engine torque by reducing the vehicle speed during vehicle movement.

(3) Start mode

Start mode applies an optimum pressure level corresponding to a specific torque generated by the engine (clutch input torque), which prevents the engine from blowing off clutch pressure when engaging the clutch when starting movement of the vehicle or after disengaging the clutch and also allows the vehicle to move smoothly.

(4) Drive mode

Drive mode applies a substantial pressure level which allows the clutch to stably resist engine torque when the clutch is fully engaged during normal movement of the vehicle.

Of the four basic patterns or modes cited above, the neutral mode is implemented by means of an exclusive switching valve (not shown) which interlinks with the shift-handling operation. The other three modes are implemented by controlling the duty ratio of the first through third three-way electromagnetic valves 42, 50, and 58 with the controller unit 70. In particular, when the drive mode is underway, clutch pressure control valve 52 allows the seventh oil path 54 and the tenth oil path 64 to be connected to each other so that the maximum pressure can be generated by the clutch pressure which is identical to the line pressure.

Primary-pressure control valve 34, line-pressure control valve 44, and clutch-pressure control valve 52 are respectively controlled by oil pressure output from the first through third three-way electromagnetic valves 42, 50, and 58. Oil pressure which controls these electromagnetic valves 42, 50, and 58, is substantially constant oil pressure generated by the constant-pressure control valve 38. The control oil pressure is constantly lower than the line pressure, but it is a quite stable constant pressure. The control oil pressure is also introduced to the primary-pressure control valve 34, line-pressure control valve 44, and the clutch-pressure control valve 52 in order that performances of these can be stabilized.

Next, referring now to FIG. 1, operation of the failure mode controller for pressure sensor 68 is described below.

Should there be a failure such as a malfunction of pressure sensor 68, or disconnection or short-circuit of a signal cable, then switches SW1 and SW2 are both actuated to allow the failure mode to be activated. Objective clutch pressure ($P_{CCSP}$) needed for transmitting engine torque is established by adding clutch-engaged pressure ($P_{CEF}$) of the failure mode to the objective clutch pressure ($P_{CC}$) calculated in each mode. Note that the clutch-engaged pressure ($P_{CEF}$) under the failure mode is determined by subtracting 0.5 kg/cm$^2$ from the normally available clutch-engaging pressure ($P_{CE}$).

Objective line pressure ($P_{CC}$) is determined in each of the control modes as was done prior to entering failure mode. The controller unit 70 outputs the objective line pressure ($P_{LINSP}$). Then, based on the expression ($P_{CCSP} \div P_{LINSP}$)×100 (%), the ratio between these is calculated. Then, with reference to FIG. 2, a clutch duty ratio (CD), based on previously stored values set by addition of a safety margin, is eventually determined and is delivered to the duty ratio signal generator via switch SW2.

Figure 5:
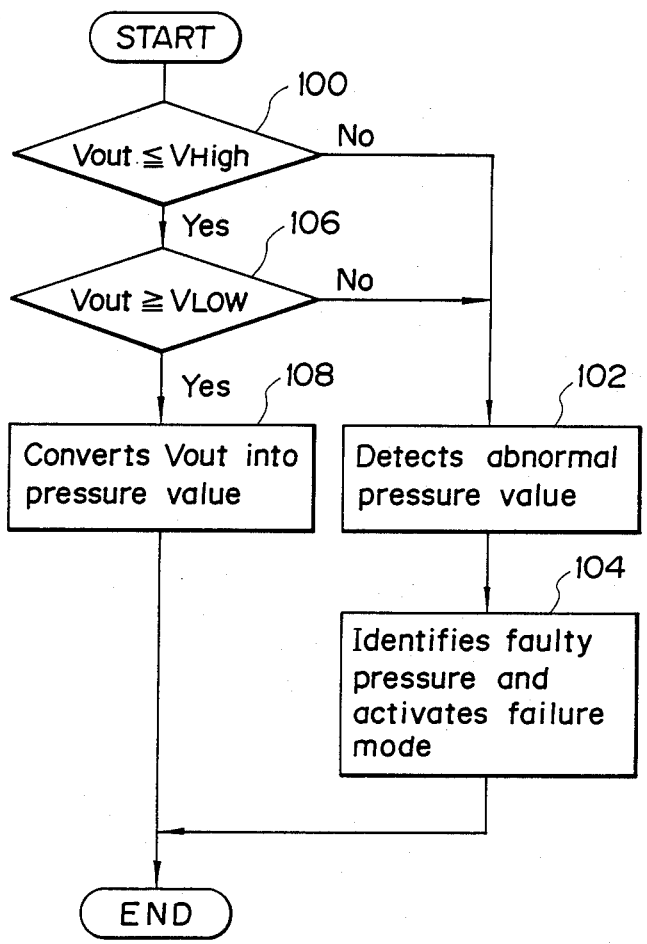
FIG. 5 is an operational flowchart relating to control of clutch pressure.

Next, referring now to FIG. 5 denoting the clutch-controlling flowchart, sequential operations related to the control of clutch pressure are described below.

When step 100 is entered, the controller unit 70 checks to see if the voltage Vout produced from amplifier 86 in response to the detected pressure value from pressure sensor 68 is lower than the upper limit Vhigh. If it is higher than the upper limit Vhigh, then step 102 is entered to cause the controller unit 70 to identify that an abnormal condition is present in the clutch pressure value and to then determine that pressure sensor 68 has malfunctioned. This activates step 104, in which the controller unit 70 effectively actuates both switches SW1 and SW2 so that the failure mode can be entered. Conversely, if the controller unit 70 determines that voltage Vout is lower than the upper limit Vhigh, then step 106 is entered, in which the controller unit 70 checks to see if the voltage Vout is higher than the lower limit Vlow. If it is lower than the lower limit Vlow, step 102 is entered, in which the controller unit 70 identifies that an abnormal condition is present in the clutch-pressure value. Conversely, if the controller unit 70 determines that voltage Vout is higher than the lower limit Vlow, step 108 is entered, in which the analog output voltage Vout is accepted and is converted into the digital pressure value by the A/D converter 88.

By implementing these sequential operations, if amplifier 86 between pressure sensor 68 and the controller unit 70 outputs a certain voltage which is out of the predetermined range bounded by the predetermined upper and lower limits, then the controller unit 70 calculates the clutch duty ratio in reference to the objective clutch pressure value and the objective line pressure. This allows the controller unit 70 to properly control clutch pressure in accordance with the calculated clutch duty ratio, thus allowing the clutch pressure control system to correctly control clutch pressure even when the pressure sensor malfunctions, when the atmospheric temperature drops extremely, or when a signal cable is disconnected or short-circuited, circuited, by generating a satisfactory clutch control effect almost equivalent to that generated during normal operation. Since the clutch control system according to the invention constantly and properly controls clutch pressure even when the faulty states mentioned above are present, it securely prevents the occurrence of failures like an inability to start movement of the vehicle and an unwanted generation of sharp shock from the clutch engagement caused by varied clutch pressure.

Figure 8:
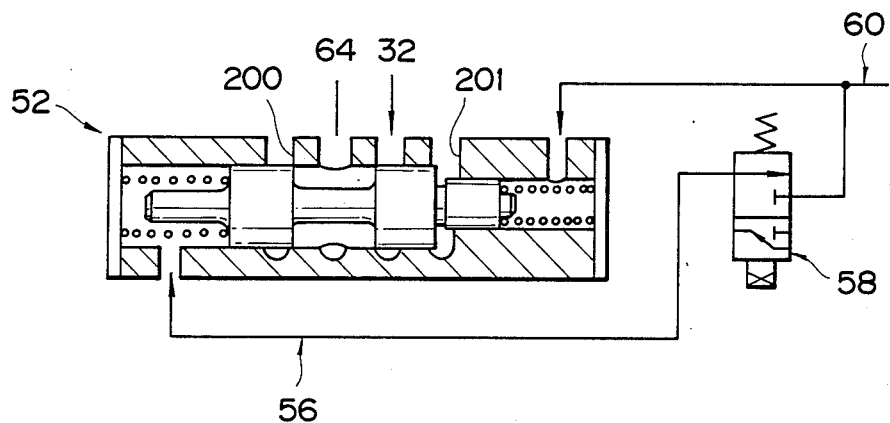
FIG. 8 is a diagrammatic sectional view of two valves which are components of the system of FIG. 6.

FIG. 8 is a diagrammatic view of the valves 52 and 58, and shows the manner in which they are connected to the oil paths 32, 56, 60 and 64. The electrical signal controlling the valve 58 is a pulse train which is at a selected frequency and which has a duty ratio (the ratio of the pulse width to the period of the signal) which can be varied between 0% and 100%. Of course, at the limits of 0% and 100% the signal ceases to be a pulse train and is continuously on or off so as to keep the valves continuously actuated or deactuated. At values between 0% and 100%, the spool of valve 52 is moved by each pulse for a time dependent on the width of the pulse. Thus, varying the duty ratio varies the relative times the output 64 communicates with each of the ports 200 and 32, thereby varying the pressure in path 64 within a range bounded by atmospheric pressure and the pressure in path 32.

Variation of the pressure in chamber 22 by valve 34 through line 30 causes the pulley member 8 to move axially toward or away from the pulley member 6, thereby varying the width of the space between them. Due to the frustoconical surfaces on the members 8 and 6 engaged by the belt 2A, variation of the relative positions of the members 8 and 6 changes the effective radius of the pulley 4 with respect to the belt 2A, thereby varying the drive ratio of the mechanism. By varying the duty ratio of the electrical signal applied to valve 42, the primary pressure in oil path 30 can be varied so as to vary the drive ratio from a full-low ratio through various ratios to a full overdrive ratio.

The controller unit 70 preferably is a conventional microprocessor, but could alternatively be an equivalent dedicated control circuit.

Figure 10:
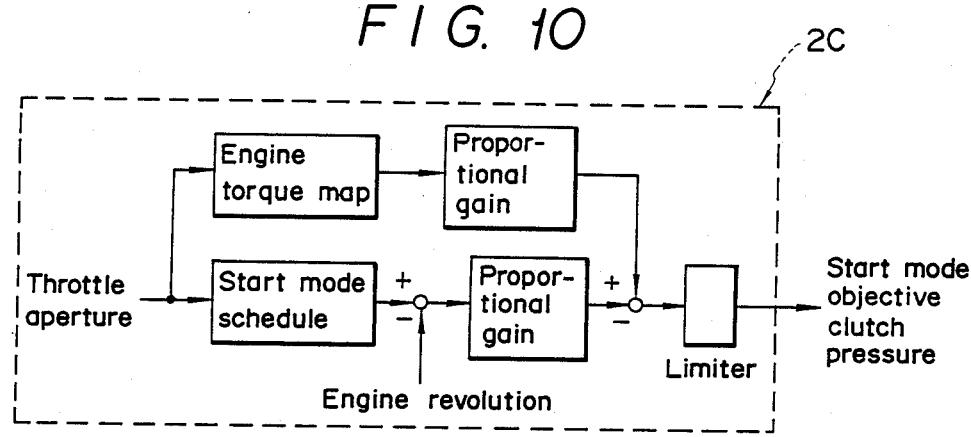
FIG. 10 is a schematic block diagram of a control component of the system of FIG. 1.
Figure 11:
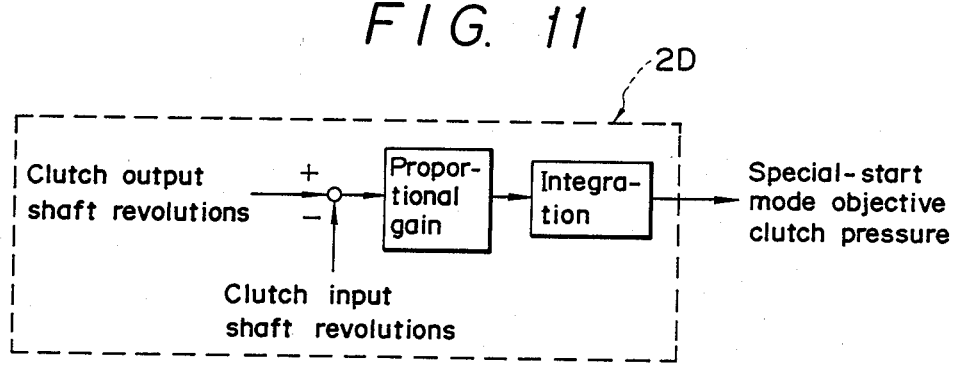
FIG. 11 is a schematic block diagram of a control component of the system of FIG. 1.
Figure 12:
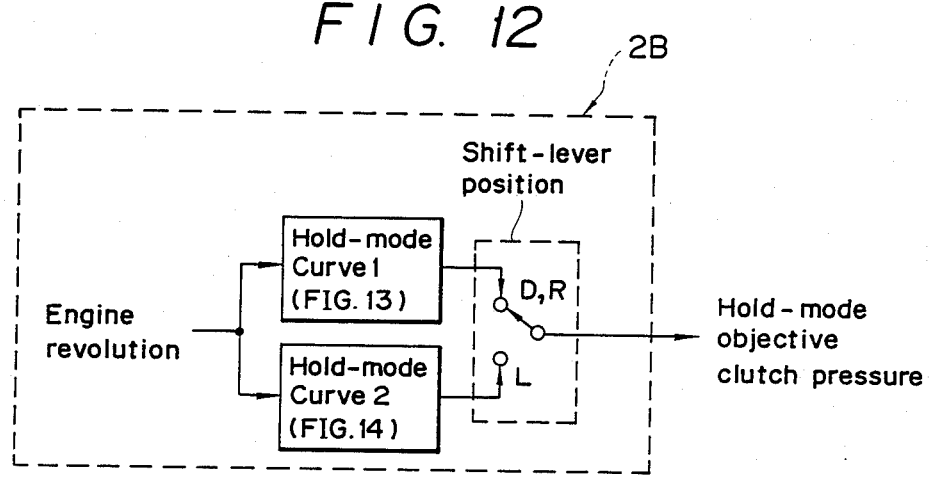
FIG. 12 is a schematic block diagram of a control component of the system of FIG. 1.
Figure 13:
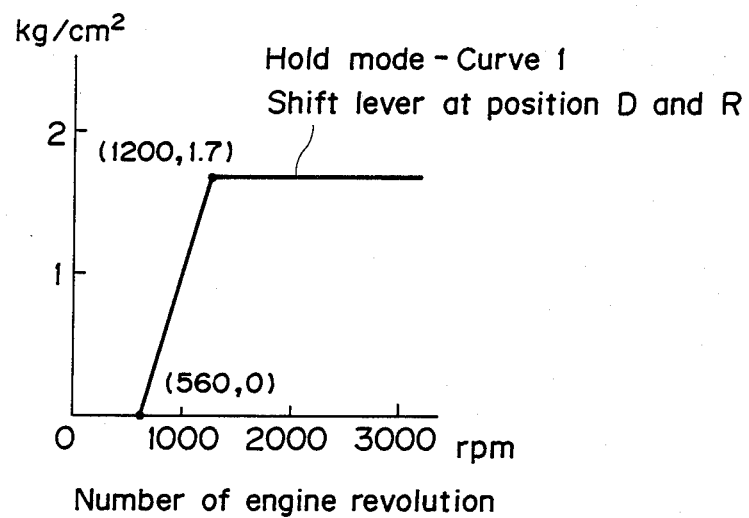
FIGS. 13 and 14 are graphs of respective curves utilized by the control component of FIG. 12.
Figure 14:
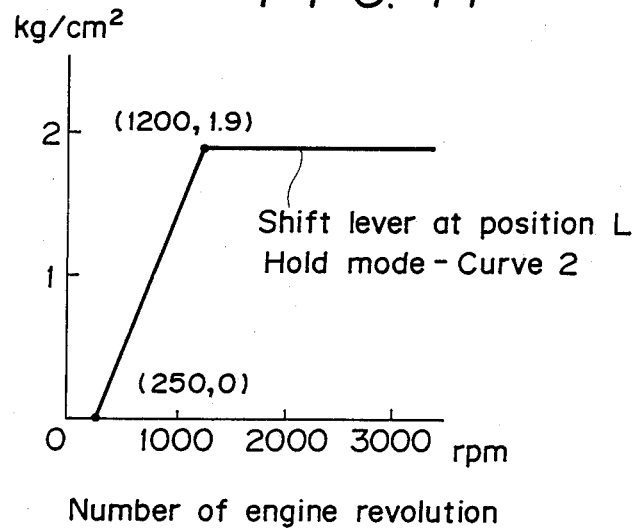

FIG. 9 is a table summarizing the basic clutch pressure control criteria in the nonfailure mode, or in other words when the switches SW1 and SW2 of FIG. 1 are not actuated. FIGS. 10, 11 and 12 respectively depict preferred arrangements of the controllers 2C, 2D, and 2B of FIG. 1, and FIGS. 13 and 14 show curves used by the controller 2B. The clutch input and output shaft revolutional speeds used in the controller 2D are preferably measured by conventional and not-illustrated devices cooperable with the clutch input and output shafts.

As is clear from the foregoing description of the invention, the clutch pressure control system according to the invention is provided with a controller unit which executes control of clutch pressure by feeding the actually detected clutch pressure back to the objective clutch pressure and has an oil-pressure circuit which controls clutch pressure in response to signals from the controller unit, wherein the controller unit calculates clutch duty ratio in reference to the objective clutch pressure and the objective line pressure when pressure sensor detecting clutch pressure outputs abnormal signals, thus allowing the system to properly control clutch pressure based on the calculated duty ratio. As a result, the continuously variable transmission system related to the invention can correctly control clutch pressure even when an unwanted failure occurs, for example due to malfunction of a pressure sensor, disconnection or short-circuit of a signal cable, or presence of extremely low atmospheric temperature, by generating a satisfactory control effect almost equivalent to that generated during a normal condition of use. As a result, the clutch pressure control system related to the invention securely prevents occurrence of faulty conditions like the inability to start movement of the vehicle or generation of a sharp shock from clutch engagement caused by varied clutch pressure, thus offering a practical advantage.

The embodiments of the invention in which an exclusive property or privilege is claimed are defined as follows:

1. A method of controlling clutch pressure in a continuously variable transmission system which can expand and contract a width of a channel between a stationary pulley member and a movable pulley movable relative to said stationary pulley member in order to respectively contract and expand a radius of travel about said pulleys of a belt engaging said pulleys before eventually varying a belt ratio, clutch-pressure control means of said continuously variable transmission system including a controller unit which effects control by feeding an actually-detected clutch pressure back in determining an objective clutch pressure and including an oil-pressure circuit which controls oil pressure in response to signals from said controller unit; said method comprising a step of: causing said controller unit to calculate a clutch duty ratio in reference to the objective clutch pressure and an objective line pressure when a pressure sensor detecting said actually-detected clutch pressure outputs an abnormal signal before eventually causing said controller unit to control the clutch pressure in accordance with said calculated clutch duty ratio.

2. The method of claim 1, including the step of determining that said pressure sensor is outputting abnormal signals when signals therefrom are outside a predetermined range bounded by predetermined upper and lower limits.

* * * * *